Figure 6:
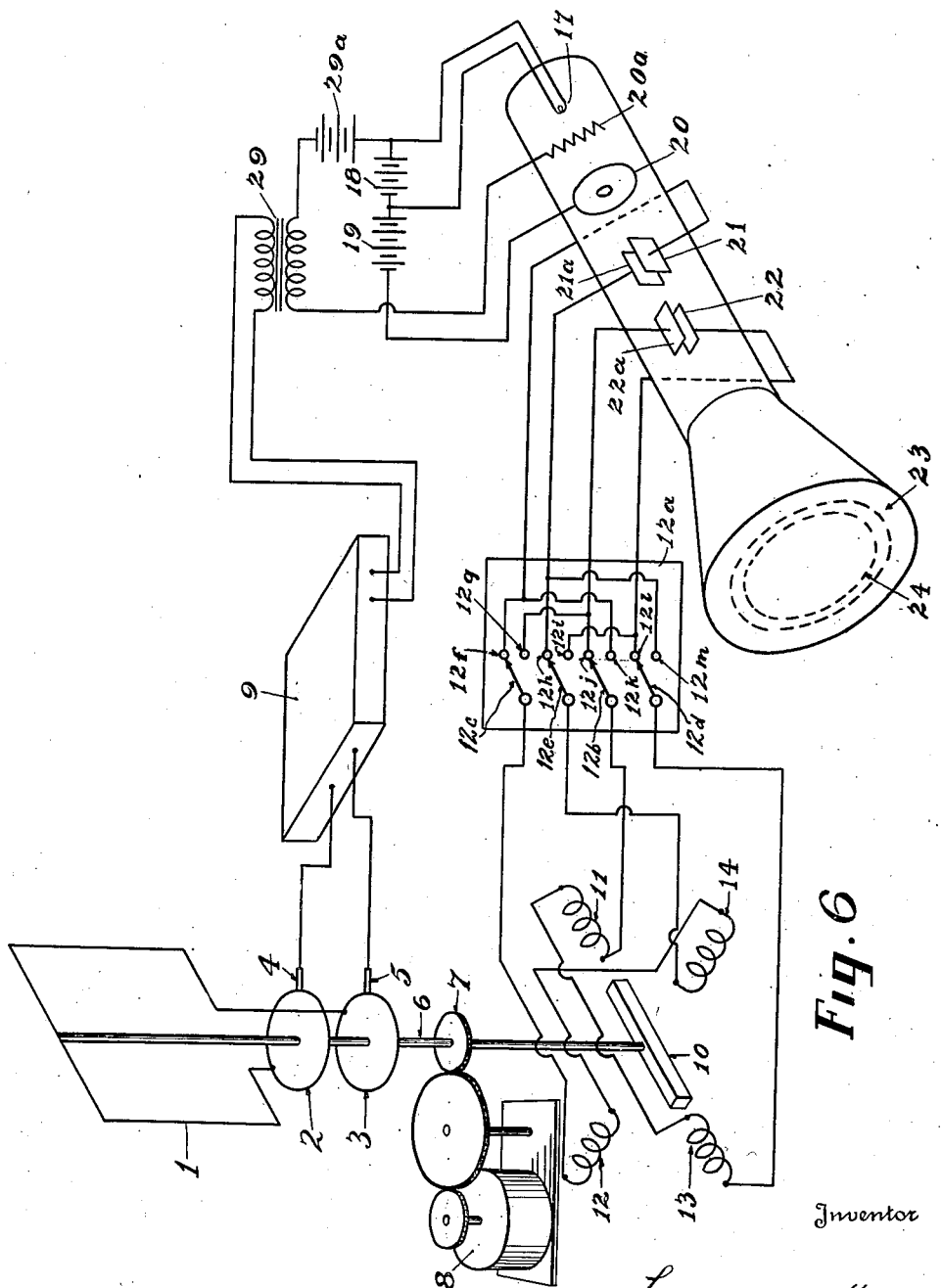

March 28, 1939.  L. A. HYLAND  2,151,917
RADIO APPARATUS
Filed July 24, 1935  3 Sheets-Sheet 1
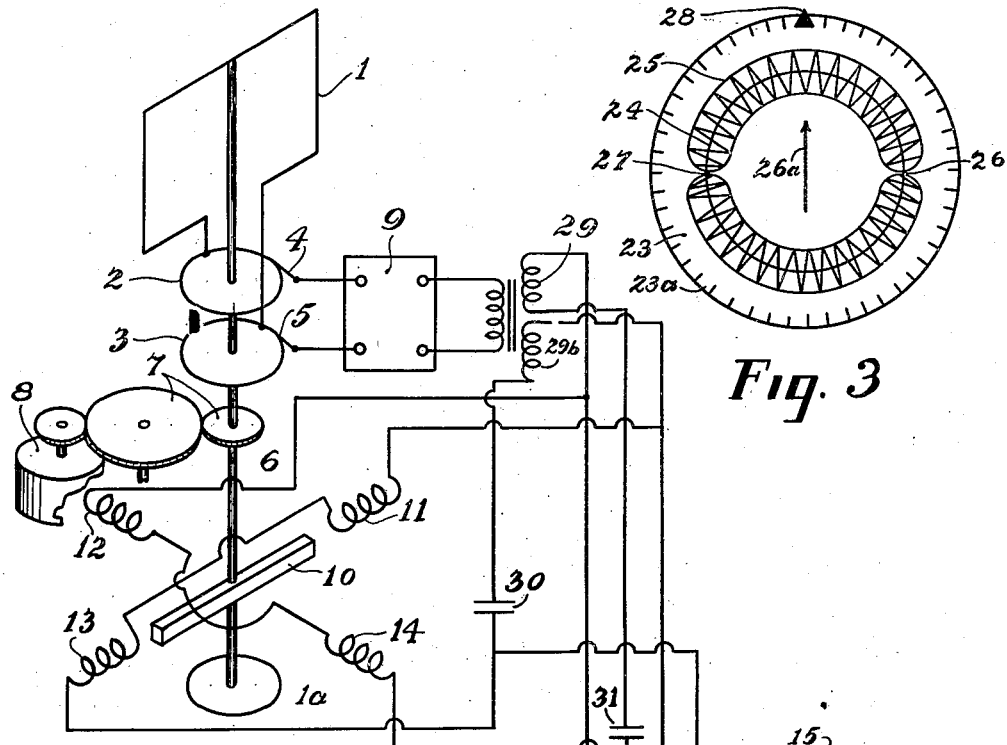
*Fig. 3*
*Fig. 1*
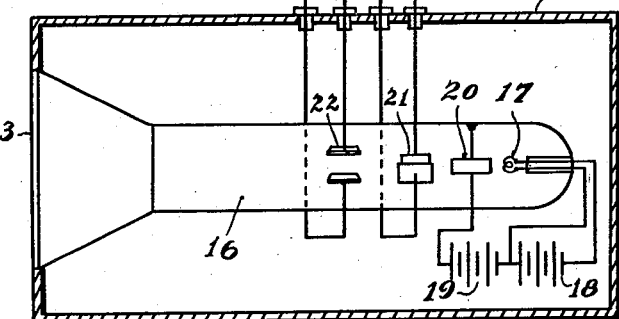
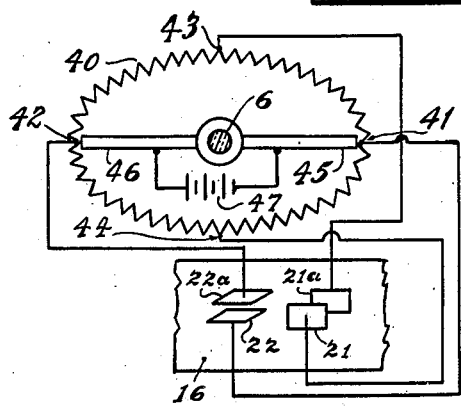
*Fig. 2*
Inventor
Lawrence A. Hyland
By Ben J. Chromy
His Attorney March 28, 1939.   L. A. HYLAND   2,151,917
RADIO APPARATUS
Filed July 24, 1935   3 Sheets-Sheet 2
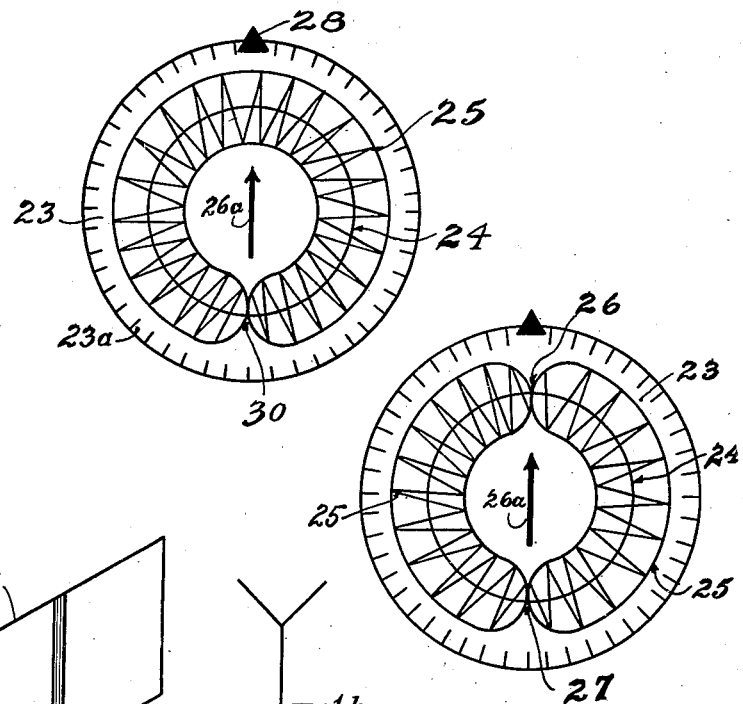
Fig. 4
Fig. 5
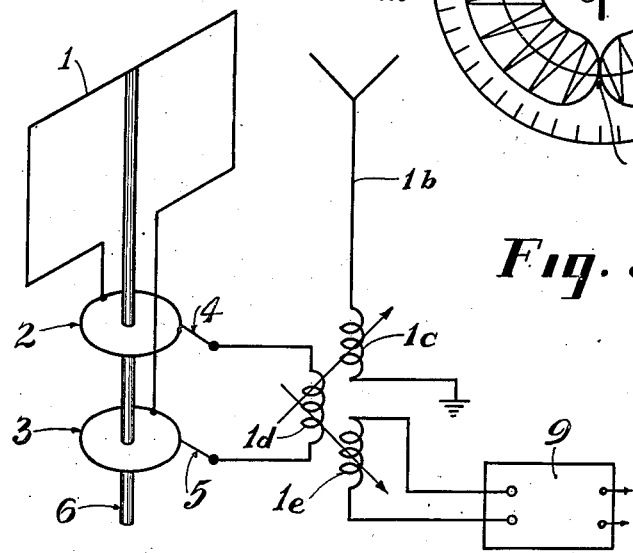
Fig. 7
Inventor
Lawrence A. Hyland.
By Ben J. Chromy
Attorney March 28, 1939.	L. A. HYLAND	2,151,917
RADIO APPARATUS
Filed July 24, 1935	3 Sheets-Sheet 3

Inventor
Lawrence A. Hyland
By Benj.␣Chorny
Attorney

Patented Mar. 28, 1939

2,151,917

UNITED STATES PATENT OFFICE 2,151,917

RADIO APPARATUS

Lawrence A. Hyland, Washington, D. C., assignor, by mesne assignments, to Bendix Radio Corporation, New York, N. Y., a corporation of Delaware Application July 24, 1935, Serial No. 32,955

4 Claims. (Cl. 250—11)

This invention relates to radio apparatus generally. More particularly this invention relates to radio signal receivers employing visual indicator apparatus for indicating the intensity characteristics of signals received on a directional antenna or antennas.

An object of this invention is to provide a signal receiver, sensitive to radiant energy, with a visual indicator adapted to indicate continuously the intensity of signaling energy received over a bi-laterally selective antenna as the plane of said antenna is changed with respect to the signal transmitter.

Another object of this invention is to provide a radiant energy signal receiver having a visual indicator adapted to indicate continuously the intensity of the signal energy being received from a given transmitting station and the direction of that station.

Still another object of this invention is to provide a radiant energy signal receiver having a visual indicator adapted to indicate continuously the intensity and direction of signal energy being received on a given frequency channel.

A further object of this invention is to provide a radiant energy signal receiver with a cathode ray tube indicator and a loop antenna adapted to be rotated and having an arrangement for rotating the beam of the cathode ray tube simultaneously as the loop is rotated.

Still another object is to provide a radiant energy signal receiver with a cathode ray indicator in which the intensity and position of the beam image on the indicator screen is controlled to indicate the direction or bearing of a given or selected transmitting station.

Other and further objects of this invention will be apparent from the following description of an embodiment thereof and the following claims.

According to this invention, I employ a signal receiver for receiving radiant energy of any predetermined frequency and employing a directional antenna, such as, a loop or combined loop and non-directional antenna for the purpose of energizing a radiant indicator which indicates the direction from which the signals are received. The output of the receiver is impressed upon selected electrodes of a cathode ray tube or similar device having a screen for rendering the beam or ray of the tube visible. An arrangement is provided on the loop for generating a pulsating or alternating electrical potential as the loop is rotated. This potential is applied to the deflecting electrodes of the cathode ray tube for causing the beam of the tube to describe a circular or elliptical figure on the screen of the tube as the loop antenna is rotated. The signal energy received by the antenna is then impressed upon the cathode ray tube in any suitable way to modulate the beam of the tube and indicate the signal energy received at the exact instant it is received.

Further details of the operation and construction of an embodiment of my invention will be set forth more fully in the following description and the drawings, in which briefly, Fig. 1 illustrates a schematic diagram of connections embodying this invention; Fig. 2 shows a modified form of deflector plate control; Figs. 3, 4 and 5 illustrate signal intensity patterns obtained in accordance with this invention; Fig. 6 shows a modified form of this invention; and Fig. 7 shows a modified form of antenna arrangement employed in accordance with this invention.

Referring to Fig. 1 in detail, reference numeral 1 designates a loop antenna mounted on a shaft 6 which is rotated by the motor 8 associated with the gears 7. Slip rings 2 and 3 are mounted on the shaft 6 and connected to the loop antenna 1. Brushes 4 and 5 are provided to the slip rings 2 and 3, respectively, for the purpose of connecting the loop to the receiver 9. Any other type of connection may be employed between the receiver 9 and the loop 1, such as, for example, an electrostatic or electromagnetic coupling between suitable condenser plates or inductance coils mounted on the loop shaft and plates or coils mounted either concentrically around the shaft or adjacent thereto.

A permanent magnet 10 is mounted on the shaft 6 to be rotated synchronously with the loop, adjacent to the windings or coils 11, 12, 13 and 14, which are placed symmetrically about the shaft 6 in the same plane as the magnet 10.

The turns 11, 12, 13, and 14 are influenced in sequence by the magnetic field of magnet 10 as the loop and magnet are rotated, causing pulsating or alternating electromotive forces to be set up in these coils in a certain predetermined time relation. In practice it may be desirable to mount these coils upon a suitable frame or frames which may themselves be magnetized and in that case the bar 10 need not be permanently magnetized.

The coils 11, 12, 13 and 14 are connected to the deflector plates 21 and 22 of the cathode ray tube 16 in such a way that the field developed between these plates rotates the cathode ray beam of the tube and produces a circular pattern on the screen 23, as shown by the line 24, Fig. 3, which describes the locus of the intersection of the beam and the screen.

It is obvious the electromagnetic windings may be placed adjacent to the neck of the tube 16 to rotate the beam electromagnetically instead of by means of an electrostatic field as in the tube illustrated. Furthermore, the electric currents for producing the rotating field in the tube may be derived from a single set of coils instead of two sets shown in Fig. 1, by means of a suitable phase splitting arrangement if desired.

The rotation of the magnet 10 between the coils 11, 12, 13 and 14 sets up alternating electromotive forces in these coils. The electromotive force in the coils 14 and 12 is displaced by 90 degrees from that set up in coils 11 and 13. Thus when these two electromotive forces are impressed upon the two sets of plates 21 and 22, which are disposed at right angles to each other, the beam is caused to rotate in accordance with the rotating electric field set up between these plates, and the path 24 of the beam on the screen 23 is rendered temporarily visible through the fluorescence of the chemical coating of the screen.

The cathode ray tube 16 is provided with a cathode or filament 17, which is heated by the current source 18, and an anode 20, which is energized by the current source 19. The anode 20 is maintained electrically positive with respect to the filament 17 and may be employed as a beam focusing electrode by applying the proper potential thereto. This electrode is preferably a small hollow cylinder or a ring. Additional focusing electrodes may be employed where desired. The cathode ray tube is preferably mounted in a cabinet 15 and if desired the space around the tube may be filled with shock and vibration absorbing material, such as felt, porous rubber and the like.

The output of the receiver 9 is connected through an output transformer 29 and condensers 30 and 31 to the plates 21 and 22 of the tube 16. Two of the plates 21 and 22 are connected together and these may be connected to the secondary of the transformer 29 as shown.

When a signal is impressed upon the plates 22 and 21 from the loop receiver 9, the beam of the tube 16 is caused to oscillate back and forth in a direction across the path 24 and form a dough-nut-shaped pattern 25 with two constricted sections 26 and 27. This pattern is derived when the receiver 9 is tuned to a station and the loop 1 rotated.

The points 26 and 27 correspond to the minimum signal intensity positions of the loop for a given transmitting station. The pattern shown in Fig. 3 illustrates the bi-lateral characteristics of the loop antenna and in practice a scale 23a may be provided to the circumference of the screen 23 to indicate the direction of the transmitting station.

In Fig. 4 is illustrated a signal pattern obtained with the apparatus of my invention when a non-directional antenna 1b is coupled to the input circuit of the radio receiver 9 together with the loop antenna 1, as shown in Fig. 7. Any type of coupling arrangement may be used between the antennas 1 and 1b and the receiver. The transformer type of coupling including windings 1c, 1d and 1e is a typical form of coupling unit that may be used. When the non-directional antenna and the loop are employed together the signal pattern exhibited on the screen 23 consists of only one minimum point 30 which is shifted by approximately 90 degrees from the previous minimum point 26, shown in Fig. 3. The relative position of the loop 1 with respect to the signal pattern shown in Fig. 3, is indicated by the arrow 26a pointing in the direction of the index 28.

The signal pattern, obtained by using both the loop and the non-directional antenna, is shown in Fig. 4. The loop antenna position with respect to the screen is designated by the arrow 26a which is in line with maximum and minimum signal intensity. The minimum signal intensity is designated by the point 30 of the pattern.

In order to shift the minimum points 26 and 27 of the signal pattern on the screen 23 so that they are in line with the arrow 26, which show the relative position of the plane of the loop antenna, the sequence of energization of the plates 21 and 22 of the cathode ray tube 16 is changed by a suitable switch 12a illustrated in Fig. 6. This switch is provided with four contact arms and 12b, 12c, 12d and 12e, a plurality of contacts 12f, 12g, 12h, 12i, 12j.

By switching the contact arms of the switch between different sets of these contacts the time sequence of the energization of the deflector plates 21, 21a, 22 and 22a is shifted by an angle of 90 degrees or more and the position of the minimum points on the signal pattern exhibited on the screen 23 is also shifted by a corresponding angle. With this switching arrangement the minimum points 26 and 27 of the signal pattern may be shifted to be in line with the arrow 26a.

The receiver 9 is connected to the output transformer 29, as shown in the modified form of the invention illustrated in Fig. 6 and the secondary of this transformer is connected to the cathode 17 and control electrode 20a of the cathode ray tube 16. A source 29a of biasing potential is connected between the transformer 29 and the cathode for the purpose of controlling the cathode ray beam and, if desired, for limiting the intensity of this beam sufficiently so that no fluorescence is produced on the screen 23 when no signal is being received. A different type of pattern is exhibited on the screen 23 from the patterns illustrated in Figs. 3, 4 and 5. The pattern obtained with the form of signal control of the tube 16, illustrated in Fig. 6, varies in intensity, that is, the path 24 of the beam on the screen 23 shows variations in brightness or intensity and the minimum points 26 and 27 are indicated by sections gradually decreasing in brightness.

The signal energy from the receiver 9 may be impressed through the transformer 29 or by other suitable form of coupling upon the electrode 20 if desired and the operation of the tube 16 adjusted to the most efficient or desirable point by adjusting the voltages impressed upon the electrode 20 and 20a from the batteries. Fig. 2 shows a modified form of deflector plate control in the cathode ray tube 16. The deflector plates 21 and 21a are connected to points 44 and 43 on opposite sides of the circular resistance element 40. Plates 22 and 22a are connected to points 41 and 42 of the resistance element 40, spaced by approximately 90 degrees from the points 41 and 42. This resistance element 40 is positioned around the shaft 6 in such a manner that the contact arms 45 and 46, carried by the shaft sweep over the resistance element 40 as the shaft 6 is rotated. The contact arms 45 and 46 are of conducting material, such as, copper, brass, bronze and the like, and are insulated from each other by a suitable supporting collar which holds them on the shaft 6.

The source of current supply 47 is connected to the arms 45 and 46 for the purpose of impressing a potential of varying magnitude on the deflector plates 21, 21a, 22 and 22a of the cathode ray tube 16, as the loop carrying shaft 6 is rotated. The resistance element 40 may be wound in a tapered fashion so that the potential impressed on the deflector plates simulates or varies in accordance with a sine function. However, this is not strictly necessary inasmuch as all that is required is that the electron beam of the tube 16 be rotated simultaneously as the loop antenna is rotated.

The operation of the system of my invention is as follows: Signaling energy intercepted by the loop 1 is impressed upon the radio receiver 9, which consists of any form of conventional receiver preferably of a type employing signal amplifying apparatus. The magnitude of the signal energy impressed upon the receiver from the loop varies as the loop is rotated by the motor 8 and if the signal transmission from the transmitting station being received, is substantially constant, the signal energy impressed upon the receiver will vary between two minimum and two maximum points as the loop is rotated and electromotive forces are generated in the windings 11, 12, 13 and 14. These electromotive forces are impressed upon the beam deflector plates 21, 21a, 22 and 22a of the cathode ray tube 16 and rotate the beam around in such a fashion that a circular fluorescent pattern 24 is produced on the tube screen 23 by the action of the beam. The output of the receiver 9, being connected to modulate the cathode ray beam either in intensity or in direction, causes the beam to describe upon the tube screen a pattern corresponding in time and phase to the signal received from the loop as the directional characteristics of the loop with respect to the transmitter of that signal are being varied. Thus the direction of the signal transmitter with respect to the receiving apparatus may be determined from the screen of the tube by a suitable scale or scales employed with both the tube screen and the loop shaft. Only one scale is necessary and that one may be inscribed on the screen 23 or positioned adjacent thereto. Inasmuch as the loop and the generator magnet 10 are mounted so as to be rotatable simultaneously and synchronously, the cathode ray beam is rotated synchronously with the loop. If the loop is rotated rapidly enough so that the complete signal pattern is exhibited on the tube screen within a short enough time interval, the whole signal pattern may be seen as a unit and the angular positions of the loop when the minimum signal is being received may be determined from the scale of the tube.

Should it be necessary or desirable to shift the instantaneous position of the beam with respect to the instantaneous position of the loop the switch 12a is turned to cause a shift in the time sequence of energization of the electrodes 21, 21a, 22 and 22a as described in the description of Fig. 6. This same switching arrangement or an equivalent arrangement may be employed in connection with Fig. 1.

It is apparent that other modifications of this invention may be made and therefore I do not desire to limit this invention to the exact details set forth herein except insofar as these details are defined by the appended claims.

What I claim and desire to secure by Letters Patent is as follows:

1. In radio receiving apparatus the combination of a loop antenna, means for rotating said loop antenna, a cathode ray tube, means for generating and rotating a cathode ray beam in said tube in predetermined time relation with the rotation of said loop antenna, means for controlling said cathode ray beam in accordance with signaling energy received over said loop antenna and means in circuit with said means for rotating said cathode ray beam for instantaneously shifting the angular position of said beam with respect to said tube.

2. In radio direction finders the combination of a loop antenna, means for orientating said loop antenna, a cathode ray tube having a viewing screen, means for projecting a cathode ray beam upon said screen, means for generating a rotating field as said loop antenna is orientated, and means for controlling the beam of said cathode ray tube in accordance with said rotating field and in accordance with signaling energy received over said loop antenna and means associated with the means for generating said rotating field comprising switching mechanism for instantaneously changing the angular position of said cathode ray beam upon said viewing screen.

3. In radio receiving apparatus adapted for determining direction the combination of a loop antenna and a substantially non-directional antenna coupled to said loop antenna, electrical discharge, signal amplifying means, means for rotating said loop antenna, a cathode ray tube, means for producing a rotating field for rotating the cathode ray beam of said tube over a predetermined path on the screen thereof, means for operating said last mentioned means and said loop rotating means in predetermined time relation, means for modulating said cathode ray beam in accordance with signal energy derived from the output of said amplifying means and means for advancing or retarding the rotation of said cathode ray beam by a predetermined angle for shifting the angular position of the signal pattern on said tube screen.

4. In radio receiving apparatus adapted for determining direction the combination of a rotatable directional antenna, electrical discharge device signal amplifying means, means for rotating said antenna, a cathode ray tube, generating means for producing a rotating field for rotating the cathode ray beam of said tube over a predetermined path on the screen thereof, means for operating said last mentioned means and said antenna rotating means in predetermined time relation, means for modulating said cathode ray beam in accordance with signal energy derived from the output of said amplifying means and a switch connected between said tube and said generating means for advancing or retarding the rotation of said cathode ray beam by a predetermined angle for shifting the angular position of the signal pattern on said tube screen.

LAWRENCE A. HYLAND.